United States Patent
Ferlitsch (10) Patent No.: US 7,304,758 B2
(45) Date of Patent: Dec. 4, 2007

(54) DYNAMICALLY UPDATING A PRINTER DRIVER

(75) Inventor: Andrew Rodney Ferlitsch, Tigard, OR (US)

(73) Assignee: Sharp Laboratories of America, Inc., Camus, WA (US)

( * ) Notice: Subject to any disclaimer, the term of this patent is extended or adjusted under 35 U.S.C. 154(b) by 872 days.

(21) Appl. No.: 10/109,108

(22) Filed: Mar. 27, 2002

(65) Prior Publication Data

US 2003/0184784 A1 Oct. 2, 2003

(51) Int. Cl.
G06F 3/12 (2006.01)
G06F 15/00 (2006.01)
G06K 1/00 (2006.01)

(52) U.S. Cl. .................. 358/1.15; 358/1.11; 358/1.13; 358/1.14; 358/1.16; 710/5; 710/8; 710/41; 717/168; 717/169; 717/170

(58) Field of Classification Search .............. 358/1.11, 358/1.13–1.16; 710/5, 8, 19, 41; 709/219–222; 717/108, 111, 116, 162–163, 165, 167, 168–170
See application file for complete search history.

(56) References Cited

U.S. PATENT DOCUMENTS

| | | | | |
|---|---|---|---|---|
| 5,580,177 A | * | 12/1996 | Gase et al. .................. 400/61 |
| 5,692,111 A | * | 11/1997 | Marbry et al. ............. 358/1.15 |
| 6,452,692 B1 | * | 9/2002 | Yacoub ..................... 358/1.15 |
| 6,938,261 B2 | * | 8/2005 | Camara et al. ............. 719/321 |
| 6,941,523 B1 | * | 9/2005 | Mathieson ................... 715/809 |
| 2002/0067504 A1 | * | 6/2002 | Salgado et al. ............ 358/1.15 |
| 2002/0083093 A1 | * | 6/2002 | Goodisman et al. ........ 707/511 |
| 2002/0174206 A1 | * | 11/2002 | Moyer et al. ............... 709/221 |
| 2003/0048473 A1 | * | 3/2003 | Rosen ........................ 358/1.15 |
| 2003/0200289 A1 | * | 10/2003 | Kemp et al. ................ 709/221 |
| 2003/0208569 A1 | * | 11/2003 | O'Brien et al. ............. 709/221 |

* cited by examiner

Primary Examiner—Twyler Lamb
Assistant Examiner—Yixing Qin
(74) Attorney, Agent, or Firm—Kirton & McConkie; Michael F. Krieger (57) ABSTRACT

Systems and methods for dynamically installing or updating a printer driver on a computer device without requiring a user to initiate the installation or update. In a system that includes a computer device, a printer device and a printer driver source, a print job is initiated and a connection with a printer driver source is established. A request is made for information relating to the performance of an automatic update of a dynamic printer driver. A determination is made as to whether or not an update is available. If the update is available, a determination is optionally obtained relating to whether or not the system may proceed in performing the automatic and dynamic update. The update includes obtaining dynamically linkable object components and linking the object components with a main entry object to form a dynamic printer drive that may be used to execute the print job.

23 Claims, 6 Drawing Sheets

DYNAMICALLY UPDATING A PRINTER DRIVER

BACKGROUND OF THE INVENTION

1. Field of the Invention

The present invention relates to installing or updating a printer driver. In particular, the present invention relates to systems and methods for dynamically installing or updating a printer driver on a computer device at the time of printing, without requiring a user to initiate the installation or update.

2. Background and Related Art

Drivers are currently employed in computer system configurations to interface between devices and software applications. Each device typically employs its own set of specialized commands that are known only to the driver corresponding to the device. In contrast, software applications typically access a device by using generic commands. Thus, in order to perform a task, a driver typically accepts a generic command from a software application and translates it into a specialized command that is understood by the device used to perform the task.

One example of a device is a printer that is configured to selectively provide text and/or graphics on paper. A printer may utilize one of a variety of techniques, including striking a hammer or pins against an ink ribbon, spraying ink at a sheet of paper, providing a chain of characters or pins that print a line at a time, pushing heated pins against heat sensitive paper, or utilizing laser beams, liquid crystals, or light-emitting diodes to produce an image on a drum. Each type of printer utilizes a particular printer driver, which feeds data to the printer with the use of specialized control commands established for the printer.

A user installs/updates printer drivers that are accessible by the computer system. In one technique, a printer driver is installed manually by employing an install program to transfer a copy of the printer driver from a storage medium (e.g., floppy diskette, compact disk, etc.) to the computer system. While this technique allows for the installation or updating of a printer driver, the technique suffers in that the user must know where to locate the printer driver, manually install the driver, be aware that an updated version of the printer driver exists, and reboot the computer system. Further, the installation/update of a printer driver may not be performed while the computer system is printing.

Another technique utilizes a web site as a common location for obtaining a printer driver in the performance of an installation/update of the printer driver. Typically, the website is provided by the manufacturer of the printer driver to enable a user to visit the website and download an updated version of the printer driver. Once downloaded, the user may invoke an installation program and manually install the updated version of the printer driver. While this technique facilitates the ability of a user to locate a printer driver, the user must still manually install the driver, be aware that an updated version of the printer driver exists, and possibly reboot the computer system. Moreover, the installation/update of a printer driver through the utilization of a website cannot be performed while the printer driver is locked in memory (e.g. while printing).

Thus, while techniques currently exist that are used to install or update a printer driver for use in a computer system, the techniques require the manual installation of the driver, the knowledge that an updated version of the printer driver exists, and possibly the rebooting of the computer system after the printer driver has been installed/updated. Further, current techniques are unable to install/update a printer driver while the printer driver is locked in memory (e.g. while printing).

SUMMARY OF THE INVENTION

The present invention relates to installing or updating a printer driver. In particular, the present invention relates to systems and methods for dynamically installing or updating a printer driver on a computer device at the time of printing, without requiring a user to initiate the installation or update.

Implementation of the present invention takes place in association with a system that includes a computer device, a printer device, a printer driver and a printer driver source. The printer driver from the printer driver source is selectively and dynamically updated or installed at the computer device to enable the utilization of the printer device in completing a print job. The update may be based through the utilization of a printer driver, a spooler, a print processor, or a print assist, which is any added component in the print subsystem between the printer driver and the port or print manager at the computer device. To enable the dynamic update, a printer driver is dynamically organized to include a main entry object and one or more dynamically linkable objects that are selectively organized to form the printer driver. Because the objects are dynamically linkable, the update may occur after the initiation of a print job.

Therefore, in one implementation of the present invention, a print job is initiated and then a connection with a printer driver source is established. A request is made for information relating to the performance of an automatic update of a printer driver. A determination is made as to whether or not an update is available. If the update is available, a determination is optionally obtained relating to whether or not the system may proceed in performing the automatic and dynamic update. The update includes obtaining dynamically linkable object components and dynamically linking the object components as a printer driver that may be used to execute the print job.

While the methods and processes of the present invention have proven to be particularly useful in updating a driver at the time of printing without requiring a user to initiate the installation or update, those skilled in the art will appreciate that the methods and processes of the present invention can be used to install or update a driver at a time other than a time of printing.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to installing or updating a printer driver. In particular, the present invention relates to systems and methods for dynamically installing or updating a printer driver on a computer device, without requiring a user to initiate the installation or update.

Embodiments of the present invention embrace a system that includes a computer device, a printer device, a printer driver, and a printer driver source. The printer driver from the printer driver source is selectively, dynamically, and automatically updated at the computer device to enable the utilization of the printer device in completing a print job. The update may be based through the utilization of a printer driver, a spooler, a print processor, or a print assist of the computer device. To enable the dynamic update, a printer driver is dynamically organized to include a main entry object and one or more dynamically linkable objects that are selectively organized to form the printer driver. Because the objects are dynamically linkable, the update may occur after the initiation of a print job.

In the disclosure and in the claims the term "update" or "updating" shall refer to installing, loading, or otherwise providing a printer driver, replacing an older version of a printer driver with a newer version, as well as bringing the version of the printer driver up to the most current version available, or providing an alternate version for a specific task.

The following disclosure of the present invention is grouped into two subheadings, namely "Exemplary Operating Environment" and "Dynamically Updating a Printer Driver." The utilization of the subheadings is for convenience of the reader only and is not to be construed as limiting in any sense.

Exemplary Operating Environment

Figure 1:
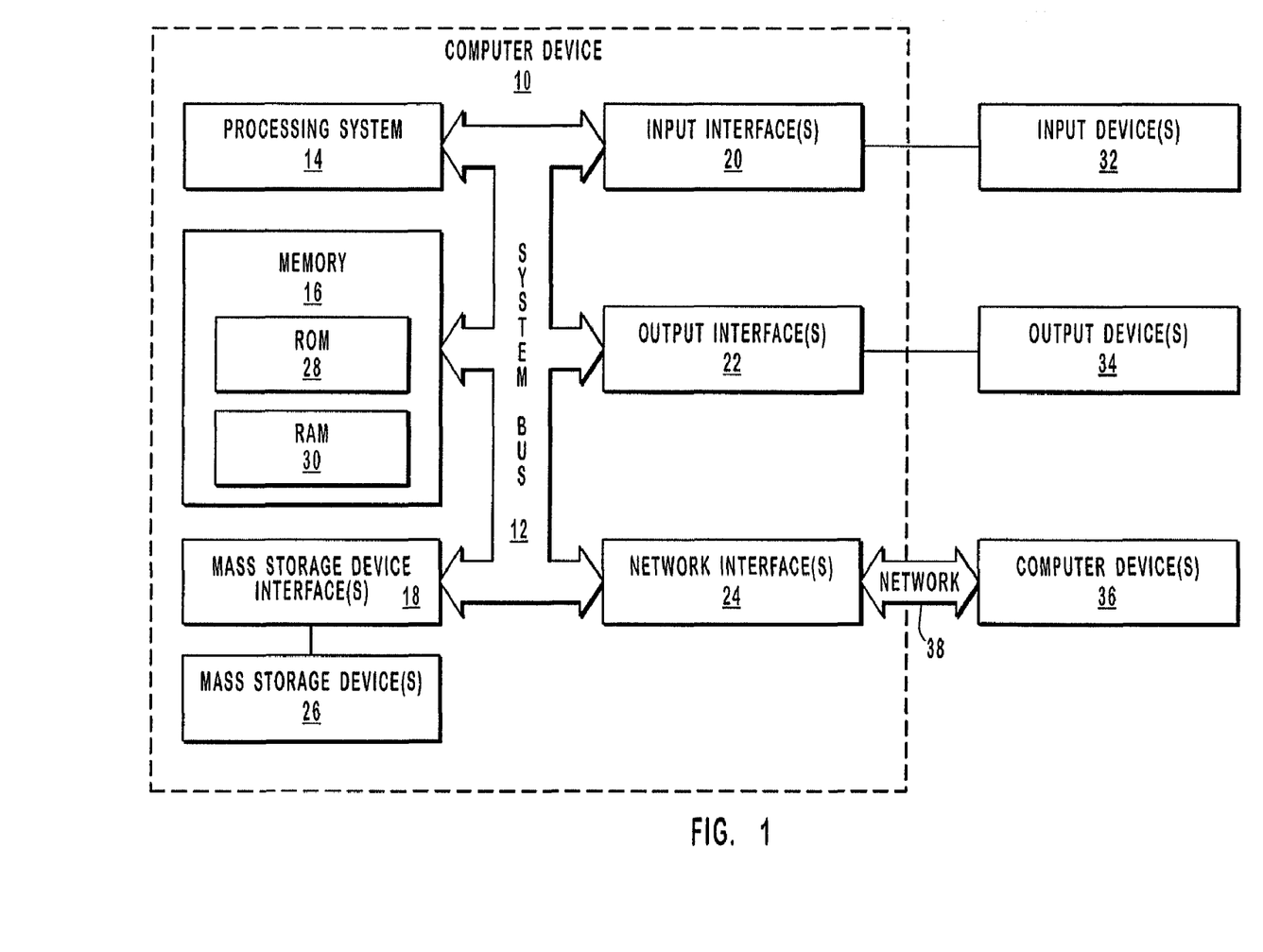
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
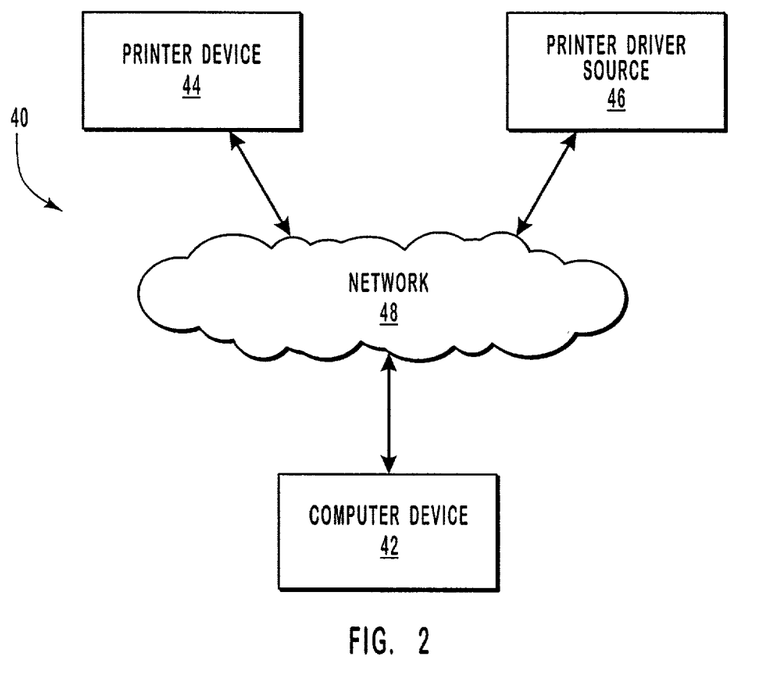
FIG. 2 illustrates a representative configuration to allow a printer driver to be obtained by a computer device and used to print a document.

While those skilled in the art will appreciate that the invention may be practiced in networked computing environments with many types of computer system configurations, FIG. 2 represents an embodiment of the present invention in a networked environment, illustrated as system 40, which includes a computer device 42, a printer device 44, and a printer driver source 46 connected across a network 48 to enable the dynamic installation and/or updating of one or more printer drivers. While FIG. 2 illustrates an embodiment that includes one computer device, one printer device, and one printer driver source, alternative embodiments include more than one computer devices, more than one printer devices, and/or more than one printer driver sources. Furthermore, embodiments of the present invention embrace the incorporation of printer device 44 and printer driver source 46 in a single device, the incorporation of computer device 42 and printer driver source 46 in a single device, or the incorporation of computer device 42, printer device, and printer driver source 46 in a single device. Moreover, those skilled in the art will appreciate that the network 48 may be a local area network, a wireless network, a wide area network, a peer-to-peer network, or a hard-wired connection.

Printer device 44 may include a printer that utilizes one of a variety of techniques, including striking a hammer or pins against an ink ribbon, spraying ink at a sheet of paper, providing a chain of characters or pins that print a line at a time, pushing heated pins against heat sensitive paper, and utilizing laser beams, liquid crystals, or light-emitting diodes to produce an image on a drum. Furthermore, printer device 44 may include a multi-function printer or peripheral ("MFP"), which is a device that serves several functions including printing. For example, an MFP may function as a printer, a scanner, a fax machine, and a photocopier machine. Furthermore, printer driver source may include a computer readable medium having one or more dynamically linkable objects, resources, or other components thereon, as will be further discussed below. Examples of printer driver sources include a computer readable medium of an MFP, a website, a server, a remote spooler, embedded firmware, and the like.

Dynamically Updating a Printer Driver

As provided above, embodiments of the present invention embrace dynamically updating a printer driver. In accordance with at least some embodiments of the present invention, the ability to dynamically update a printer driver is enabled by selectively and dynamically linking objects of a printer driver. Accordingly, and with reference to FIG. 3, a representative configuration of a dynamic printer driver is illustrated as printer driver 50, which includes a main entry object 52 and one or more dynamically linkable objects 54. In one embodiment, main entry object 52 is constant while a dynamically linkable object 54 is a component, feature, function, and/or service (e.g., a dynamic link library) that is selectively connected or organized to dynamically update a printer driver 50.

Figure 3:
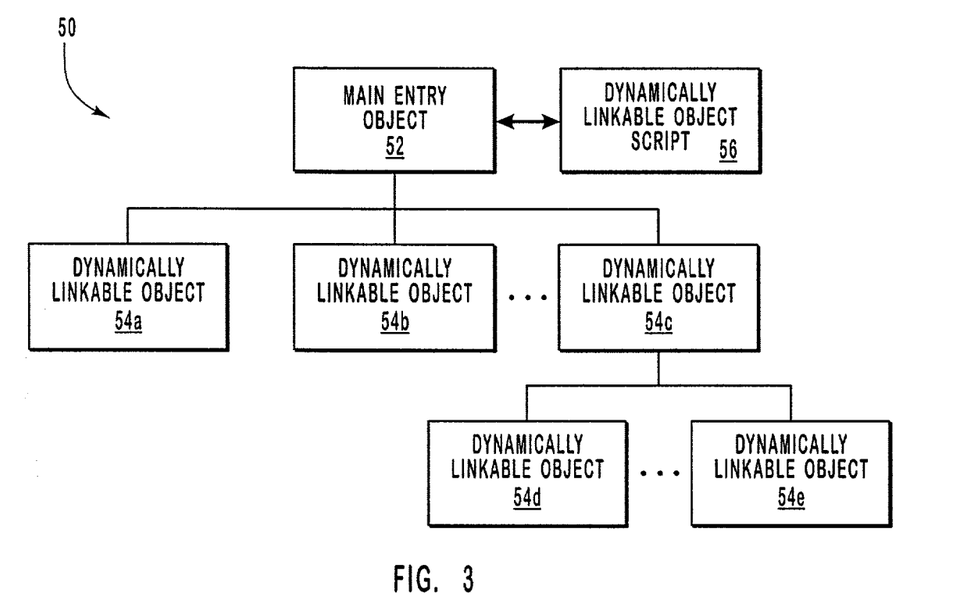
FIG. 3 illustrates a representative configuration of a dynamic printer driver that includes a main entry object and one or more dynamically linkable objects.

In one embodiment main entry object 52 includes code for loading and unloading one or more dynamically likable objects 54 (e.g., DLLs) and any required exported function entry points, which may not include any functional code other than to dynamically link objects to perform the associated function or functions. Thus, for example, a main entry object dynamically respectively links or unlinks all associated dynamically linkable objects upon initiation or completion of a print job. The unlinking of dynamically linkable objects between print jobs enables the objects to be dynamically updated since the associated executable code is not required to be located in processor memory (e.g., in an "EBUSY" state). As such, an identification and association of the dynamically linkable objects enables a dynamic change by adding or subtracting linkable objects.

As an example, dynamic printer driver 50 may include three dynamically linkable objects 54a-54c, wherein object 54a relates to a user interface, object 54b relates to a printing instruction interface from an application to the driver (e.g., an OSDDI interface for Windows®), and object 54c relates to a renderer. Further, as illustrated by dynamically linkable objects 54d-54e, one or more objects may be dynamically linked or associated with another dynamically linkable object (e.g., object 54c). Thus, in the present example, object 54d and 54e provide functionality, features and/or other enhancements to the rendering, for which object 54c is associated.

Optionally, the addition or subtraction and renaming of dynamically linkable objects are performed by a dynamically linkable object script 56, which may be located in a file on a computer readable medium, such as a disk, memory, a database, other medium, or embedded within a printer driver. Information is included to identify the physical location of the linkable objects 54. Examples of such information include a filename of an object on a computer readable medium, a library module that is internal to the updated version of the printer driver, and the like.

Figure 4A:
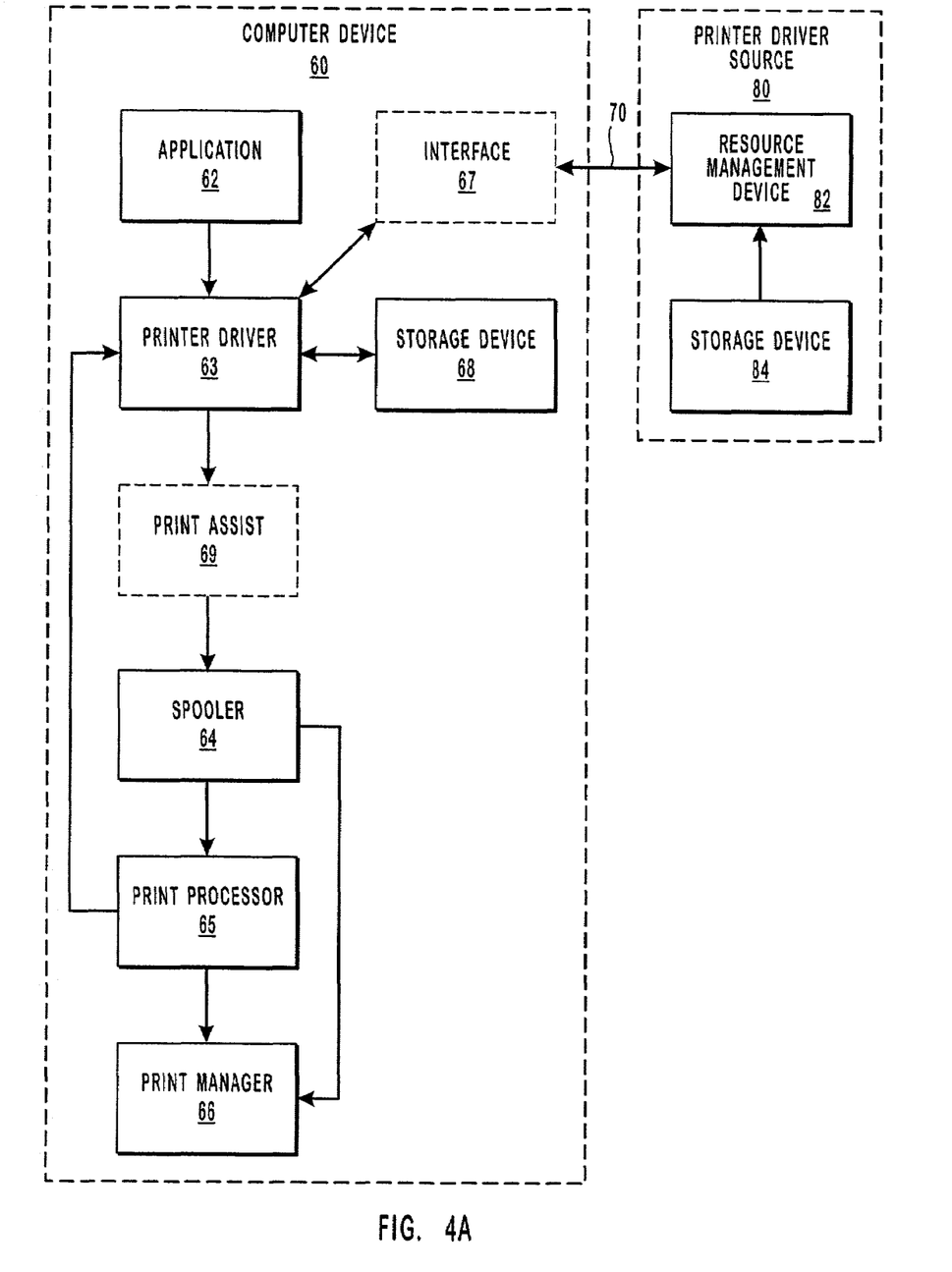
FIG. 4A illustrates a first configuration of a dynamic printer driver update that is based on a mechanism of the computer device, wherein the mechanism is a printer driver.

With reference now to FIG. 4A, a representative configuration is illustrated that includes a computer device connected to a printer driver source and utilizes a particular mechanism of the computer device to perform a dynamic update of a printer driver. In FIG. 4A, the mechanism is a printer driver, illustrated as printer driver 63.

Computer device 60 is connected to printer driver source 80 at connection 70, which may be a network connection, a hard-wired connection, a wireless connection, an integrated connection, or the like. Computer device 60 includes application 62, printer driver 63, spooler 64, print processor 65, print manager 66, storage device 68, optionally interface 67, which may be a web server, a web browser, a network file system, or the like, and optionally print assist 69, wherein print assist is any added component to the print subsystem between the printer driver and the port or print manager. When interface 67 is not included, printer driver 63 communicates directly with resource management device 82 of the printer driver source 80. Examples of a resource management device 82 include a web server, a file server, a remote spooler, or the like. Storage device 84 includes information that relates to a printer driver or processor.

In one embodiment, interface 67 is a web browser, printer driver source 80 is an MFP, and resource management device 82 is a web server. In this embodiment, the MFP (illustrated as printer driver source 80) includes an embedded printer driver stored in storage device 84 and a web server (illustrated as resource management device 82) that is accessible via a HyperText Transfer Protocol ("HTTP") request, such as a uniform resource locator ("URL"). The web page associated with the URL (e.g., 128.28.24.06:\driver) causes the printer driver components and any installation scripts to be downloaded to the client (illustrated as computer device 60). Further, the client-computing device includes a web browser (illustrated as interface 67) that is configured to selectively connect to the web server (illustrated as resource management device 87) of the printer driver source 80.

Thus, upon initiation of a print job, the main entry object of the printer driver establishes an HTTP connection. This connection may be obtained by a pre-known URL address, a table lookup, such as in a domain name system ("DNS") server, or by an automatically discovered or manually entered Internet protocol ("IP") address. The main entry object requests the URL that is associated with automatic driver updates (e.g., 128.28.24.06:\driver). A determination is then made as to whether or not an updated version of the printer driver is available. In one implementation, the URL request causes a program to be executed either on the MFP (e.g., an active service provider) or on the client computer device (e.g., Java Applet) that determines if the driver is to be updated. In another implementation, the request returns information on the driver components embedded in the printing device and the main entry object of the printer driver determines if the driver is to be updated. By way of example, a main entry object or program may utilize the following in determining if the driver is to be updated: (1) A comparison of delta levels/versions of the linkable components on the client with the levels/versions on the printing device; (2) Security or other permission requirements; (3) Optional capabilities supported in the printing device; (4) Capabilities required by the print job; or (5) The operating system and revision level.

If the main entry object or program determines that the driver is to be updated and has permission to perform such an update, the dynamically linkable objects or components of the updated driver are downloaded from the printer driver source 80 to the computer device 60. The user may optionally be requested to confirm the update prior to the download. Once the download has occurred, the user may optionally be notified of the update, and the main entry object then proceeds with the linking of the dynamically linkable objects (e.g., DLLs) and then executing the print job.

In a further embodiment, the updated printer driver is centrally managed by embedding the dynamic printer driver components in a single printing device and having the URLs associated with updating the driver from the remaining printing devices redirected to the corresponding URLs on the printing device (i.e., a Golden Master).

In another embodiment, interface 67 is a web browser, printer driver source 80 is a web site, and resource management device 82 is a web server. In this embodiment, the web site (illustrated as printer driver source 80) includes a printer driver and HTTP server that are accessible via an HTTP request (e.g., a URL). The web page associated with the URL (e.g., 128.28.24.06:\driver) causes the dynamically linkable printer driver components and any installation scripts to be downloaded to the client (illustrated as computer device 60). The client-computing device includes a web browser (illustrated as interface 67), which is configured to connect to the HTTP server (resource management device 82) at the web site (source 80).

In another embodiment, interface 67 is a network file system, printer driver source 80 is an MFP or printing device, and resource management device 82 is a file server. In this embodiment, the MFP (illustrated as source 80) includes an embedded printer driver and file server that is accessible via a network file request (e.g., NFS). The file associated with the network file request causes the dynamically linkable printer driver components and any installation scripts to be downloaded to the client (computer device 60). The client-computing device includes a network file system or interface (illustrated as interface 67) that connects to the file server (illustrated as recourse management device 82) at the MFP.

The file server (illustrated as resource management device 82) may be a common network file server, such as one that implements Linux or WinCE, which is built into the firmware of the printer device or a proprietary file server.

Upon initiation of a print job, the main entry object of the dynamic printer driver, prior to dynamically linking objects, establishes a network connection with the printing device (illustrated as source 80). This connection may be obtained, for example, by a pre-known device address, a table lookup, such as in a DNS server, by an automatically discovered or manually entered IP address, or the like. The main entry object requests any file associated with automatic driver updates (e.g., \\printer\driver). A determination may then be made as to whether there is an updated version of the printer driver. In a further embodiment, the file request implements the execution of a program either on the printer device (e.g., a device node or process object) or on the client-computing device (e.g., an executable format) that determines if the driver is to be updated. Alternatively, the file may return information relating to the driver components that are embedded in the printing device and the main entry object of the printer driver determines if the driver is to be updated.

The updated printer driver may be centrally managed by embedding the dynamic printer driver components in a single printing device and having the files associated with updating the driver from the remaining printing devices be network file requests to the corresponding files on the printing device (i.e., Golden Master).

In yet another embodiment, interface 67 is a network file system, printer driver source 80 is a server, and resource management device 82 is a file server. In this embodiment, the server (source 80), such as a print server, includes a printer driver and file server that is accessible via a network file request (e.g., NFS). The file associated with the network file request causes the dynamically linkable printer driver components and any installation scripts to be downloaded to the client (computer device 60). The client-computing device includes a network file system or interface (illustrated as interface 67), which connects to the file server (device 82) in the server device (source 80).

In an embodiment where interface 67 is not included, printer driver source 80 is an MFP or other printer device, and resource management device 82 is a remote spooler. In this embodiment, the printing device (source 80) includes an embedded printer driver and remote spooler (device 82) that is accessible via a remote print provider (e.g., a remote spooler RPC). A file, object or component that is associated with the remote spooler call causes the dynamically linkable printer driver components and any installation scripts to be downloaded to the client (illustrated as computer device 60). The client-computing device includes a print provider for that connects directly to the remote spooler (resource management device 82) in the printing device (source 80).

In a further embodiment, the remote spooler (illustrated as device 82) is a common remote spooler, such as a WinNT/2 K spooler, which is built into the firmware of the printer device or a proprietary remote spooler.

Thus, upon initiation of a print job, the main entry object of the dynamic printer driver establishes a remote connection with the printing device prior to dynamically linking objects or components. By way of example, this connection with the printing device may be performed using a pre-known device address, a table lookup, such as in a DNS server, an automatically discovered or manually entered IP address, or the like. The main entry object then requests a procedure (e.g., an RPC) associated with an automatic driver update and a determination is made as to whether or not there is an updated version of the printer driver. In one embodiment, the procedure causes a program to be executed either at the printer device (source 80) or at the client-computing device (device 60) that determines if the dynamic driver is to be updated. In another embodiment, the procedure returns information relating to the driver components that are embedded in the printing device, and the main entry object of the printer driver determines if the driver is to be updated.

In another embodiment where interface 67 is not included, printer driver source 80 is a server and resource management device 82 is a remote spooler. In this embodiment, the server (illustrated as source 80), such as a print server, includes a printer driver and remote spooler that is accessible via a remote print provider (e.g., Remote Spooler RPC). The file, object or component that is associated with the remote spooler call causes the dynamically linkable printer driver components and any installation scripts to be downloaded to the client (illustrated as computer device 80). The client-computing device includes a printer driver 63 that connects directly to the remote spooler (resource management device 82) at the server (source 80).

Thus, while the embodiments of the present invention discussed above in relation to FIG. 4A relate to a dynamic printer driver update that is based on a mechanism of the computer device, wherein the mechanism is a printer driver, those skilled in the art will appreciate that the mechanism may be another component of the print subsystem. For example embodiments of the present invention embrace situations where the mechanism is a print assist (illustrated as print assist 69), which is any added component to the print subsystem between the printer driver and the port or print manager. Other embodiments of the present invention embrace other situations where, for example, the mechanism is a spooler.

Figure 4B:
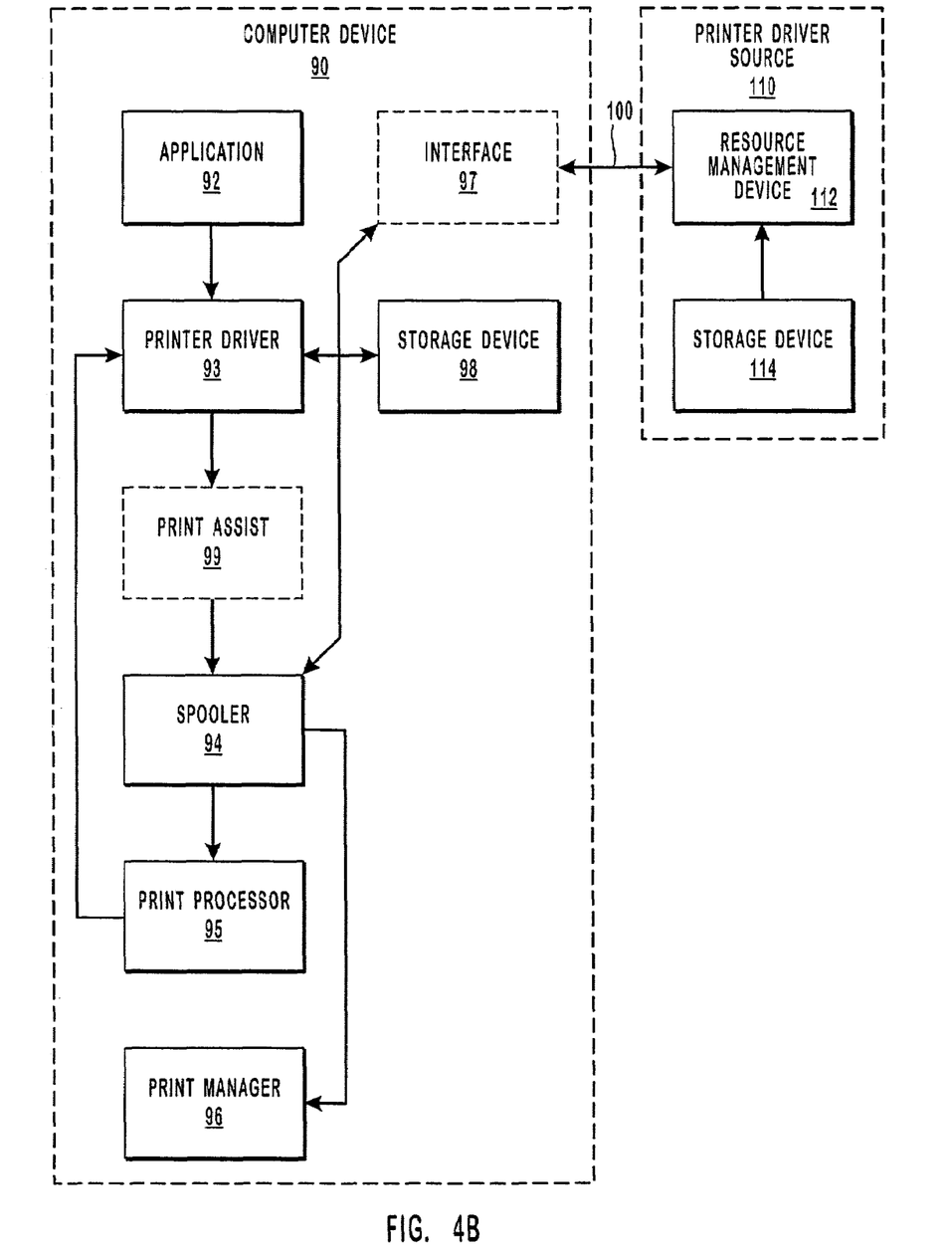
FIG. 4B illustrates a second configuration of a dynamic printer driver update that is based on mechanism of the computer device, wherein the mechanism is a spooler.

For example, and with reference now to FIG. 4B, a representative configuration is provided that includes a computer device 90 connected to a printer driver source 110 and utilizes a particular mechanism of the computer device 90 to perform a dynamic update of a printer driver, wherein the mechanism is spooler 94. In FIG. 4B, connection 100 may be a network connection, a hard-wired connection, a wireless connection, an integrated connection, or the like. Computer device 90 includes application 92, printer driver 93, spooler 94, print processor 95, print manager 96, storage device 98, and optionally interface 97, which may be a web server, a web browser, a network file system, or the like, and optionally print assist 99, which is any added component to the print subsystem between the printer driver and the port or print manager. When interface 97 is not included in computer device 90, spooler 94 communicates directly with resource management device 112 of printer driver source 110. Examples of a resource management device 112 include a web server, a file server, a remote spooler, or the like. Storage device 114 includes information that relates to a printer driver or processor.

In one embodiment, interface 97 is a web browser, printer driver source 110 is an MFP or other printer device, and resource management device 112 is a web server. In this embodiment, printer driver 93 is invoked twice. It is invoked one to journal print data and a second time to playback and render the journaled data (e.g., EMF) into printer ready data (i.e., a Raster or PDL). During the first invocation, the main entry object of the dynamic printer driver dynamically links the objects. The printer driver 93 then records the printing instructions into journaled data for deferred rendering. The journaled data is then spooled to the Spooler, and the main entry object of the dynamic printer driver unlinks the associated dynamically linkable objects.

In this embodiment, spooler 94 initiates the connecting to printer driver source 110 and/or the updating of the dynamic printer driver. Upon connecting to the printer driver source, checking for updates and/or updating a printer driver, spooler 94 despools the journaled data to print processor 95, which plays back the journaled data to the corresponding printer driver. The main entry object of the dynamic printer driver dynamically links the objects. Printer driver 93 then renders the journal data into printer ready data and despools the data to spooler 94.

In another embodiment that is spooler based, interface 97 is a web browser, printer driver source 110 is a web site, and resource management device 112 is a web server. Alternatively, in another embodiment that is spooler based, interface 97 is a network file system, printer driver source 110 is an MFP or other printer device, and resource management device 112 is a file server. In yet another embodiment, interface 97 is a network file system, printer driver source 110 is a server, and resource management device 112 is a file server. Where interface 97 is not included in computer device 90, spooler 94 communicated directly with resource management device 112, which is a remote spooler at a printer device (e.g., an MFP) or a server.

Thus, while the embodiments of the present invention discussed above in relation to FIG. 4B relate to a dynamic printer driver update that is based on a mechanism of the computer device, wherein the mechanism is a spooler, those skilled in the art will appreciate that the mechanism may be another component of the print subsystem. For example embodiments of the present invention embrace situations where the mechanism is a print assist (illustrated as print assist 99), which is any added component to the print subsystem between the printer driver and the port or print manager. Other embodiments of the present invention embrace other situations where, for example, the mechanism is a print processor.

Figure 4C:
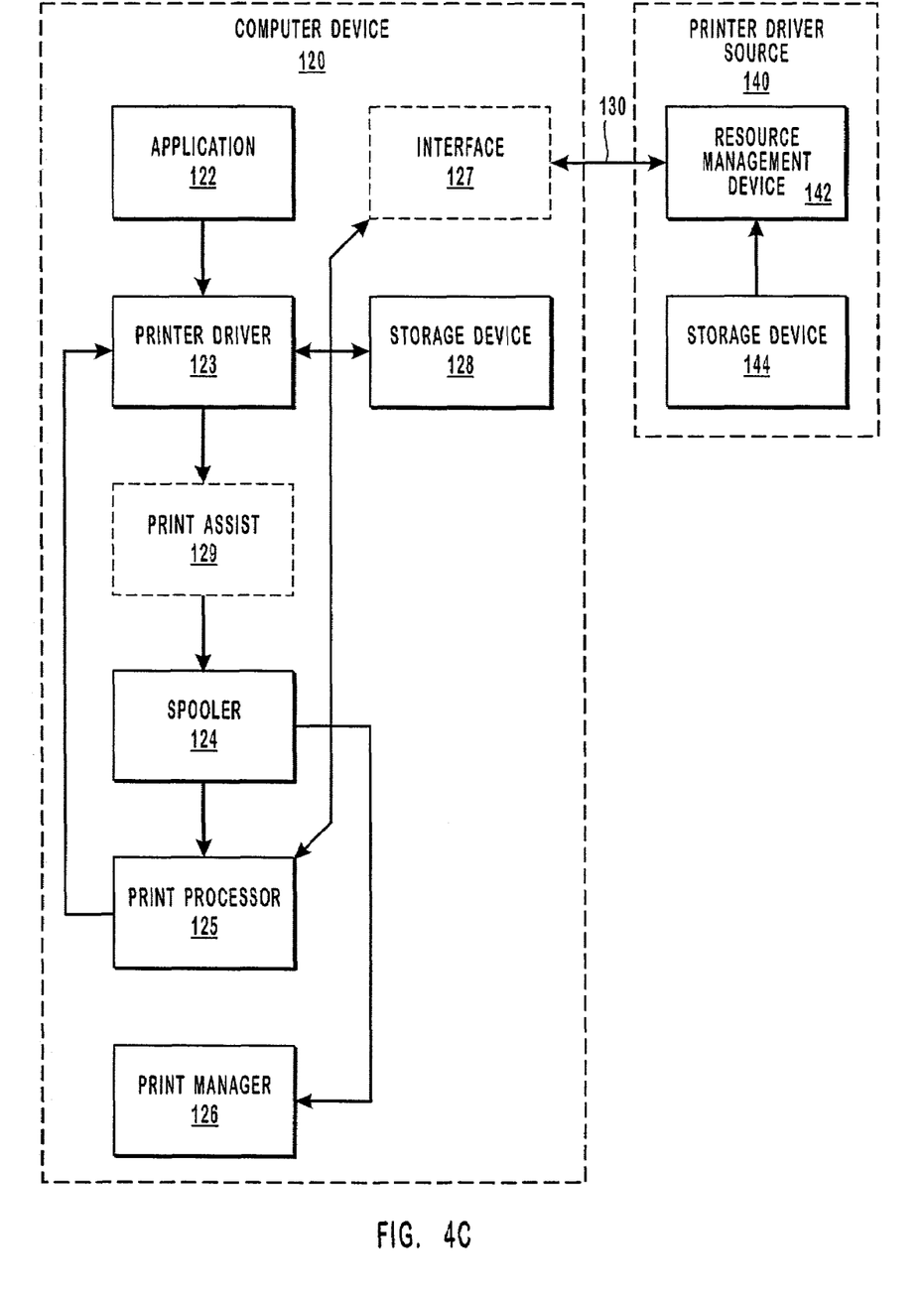
FIG. 4C illustrates a third configuration of a dynamic printer driver update that is based on a mechanism of the computer device, wherein the mechanism is a print processor.

For example, and with reference now to FIG. 4C, a representative configuration is provided that includes a computer device 120 connected to a printer driver source 140 and utilizes a particular mechanism of the computer device 120 to perform a dynamic update of a printer driver, wherein the mechanism is print processor 125. In FIG. 4B, connection 130 may be a network connection, a hard-wired connection, a wireless connection, an integrated connection, or the like. Computer device 120 includes application 122, printer driver 123, spooler 124, print processor 125, print manager 126, storage device 128, and optionally interface 127, which may be a web server, a web browser, a network file system, or the like, and optionally print assist 129, which is any added component to the print subsystem between the printer driver and port or print manager. When interface 127 is not included in computer device 120, print processor 125 communicates directly with resource management device 142 of printer driver source 140. Examples of a resource management device 142 include a web server, a file server, a remote spooler, or the like. Storage device 144 includes information that relates to a printer driver or processor.

In one embodiment, interface 127 is a web browser, printer driver source 140 is an MFP or other printer device, and resource management device 142 is a web server. In another embodiment that is print processor based, interface 127 is a web browser, printer driver source 140 is a web site, and resource management device 142 is a web server. Alternatively, in another embodiment that is print processor based, interface 127 is a network file system, printer driver source 140 is an MFP or other printer device, and resource management device 142 is a file server. In yet another embodiment, interface 127 is a network file system, printer driver source 140 is a server, and resource management device 142 is a file server. Where interface 127 is not included or used in computer device 120, print processor 125 communicated directly with resource management device 142, which is a remote spooler at a printer device (e.g., an MFP) or a server.

In such embodiments that are print processor base, printer driver 123 is invoked twice. Once it is invoked to journal print data and a second time it is invoked to play back and render the journaled data (e.g., EMF) into printer ready data (i.e., Raster or PDL). During the first invocation, the main entry object of the dynamic printer driver links the object. Printer driver 126 then records the printing instructions into journaled data for deferred rendering, and the journaled data is spooled to the spooler 124. The main entry object of the printer driver unlinks the associated dynamically linked objects. Spooler 124 then despools the journaled data to print processor 125, which performs the action of connecting to the printing device (source 140) to determine and/or update the dynamic driver. Upon connecting and checking for updates, print processor 125 plays back journaled data to the corresponding printer driver 123.

While the embodiments of the present invention discussed above in relation to FIG. 4C relate to a dynamic printer driver update that is based on a mechanism of the computer device, wherein the mechanism is a print processor, those skilled in the art will appreciate that the mechanism may be another component of the print subsystem. For example embodiments of the present invention embrace situations where the mechanism is a print assist (illustrated as print assist 129), which is any added component to the print subsystem between the printer driver and the port or print manager. Thus, in accordance with at least some of the embodiments of the present invention, the print assist performs the action of connecting to the printing device to determine and/or update the dynamic printer driver, wherein a print assist is a component added anywhere in the print subsystem or print stream.

Figure 5:
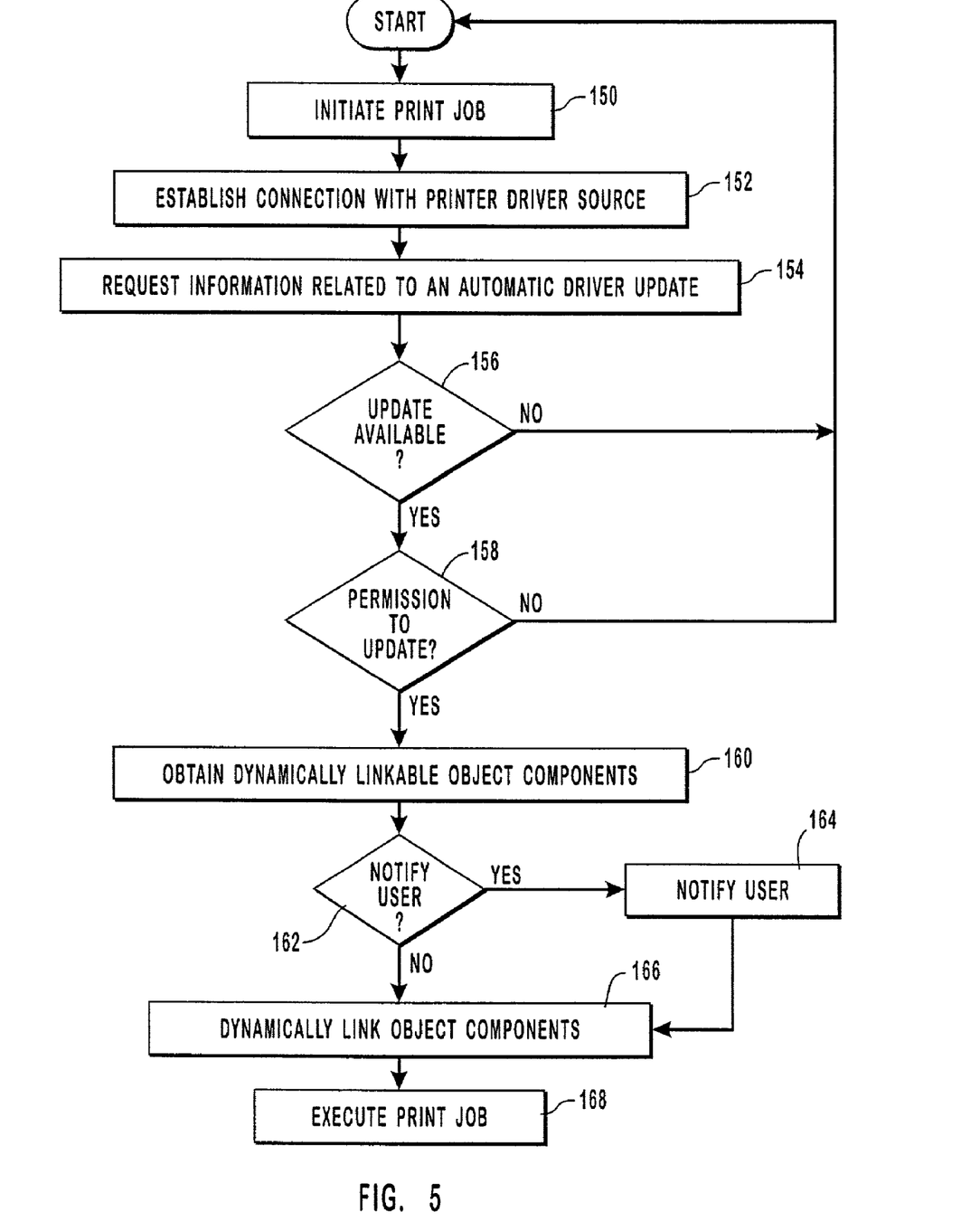
FIG. 5 is a flowchart that illustrates a representative embodiment for updating a printer driver in accordance with the present invention.

With reference to FIG. 5, a flowchart is provided that illustrates a representative method for dynamically updating a printer driver in accordance with the present invention. In FIG. 5, execution begins at step 150 where a print job is initiated by a user or application. At step 152, a connection is established with a printer driver source as disclosed herein. A request for information related to an automatic driver update is performed at step 154. Execution then proceeds to decision block 156 for a determination as to whether or not to perform an update or if an update is available in accordance with the techniques described herein. If no update is available, execution returns back to start.

Alternatively, if an update is available, execution optionally proceeds to decision block 158 for determination as to whether or not permission exists to perform an update. If permission is not obtained to perform an update, execution returns back to start.

Alternatively, if permission to perform the update exists, execution proceeds to step 160 where the various dynamically linkable object components are obtained. Execution then optionally proceeds to decision block 162 for determination as to whether or not to notify the user that the dynamically linkable object components have been received. If it is determined that the user is to be notified, execution proceeds to step 164 to notify the user and then to step 166. Alternatively, if the user is not to be notified, execution proceeds directly to step 166. At step 166, the dynamically linkable object components are dynamically linked and execution proceeds to step 168, where the print job is executed.

Those skilled in the art will appreciate that embodiments of the present invention may be utilized in association with a variety of operating systems, including Windows® operating systems, Apple MacIntosh operating systems, Linux operating systems, System V Unix operating systems, BSD Unix operating systems, OSF Unix operating systems, and IBM Mainframe MVS operating systems.

Thus, as discussed herein, embodiments of the present invention embrace systems and methods for dynamically installing or updating a printer driver on a computer device without requiring a user to initiate the installation or update. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for automatically updating a printer driver after printing is initiated without requiring user initiation of an update comprising:
   providing all functional code required for performing printer driver specific functions as dynamically linkable objects accessible by a main entry object of a printer driver, wherein the main entry object lacks functional code for performing printer driver specific functions;
   initiating a request to the main entry object to render a print job, wherein the printer driver comprises the main entry object but lacks functional code required to process the print job at the time the request to render the print job is initiated to the main entry object;
   performing the following steps, using the main entry object, after the request to render the print job is initiated:
      contacting a printer driver source to determine whether any updated dynamically linkable objects are available and, if one or more updated dynamically linkable objects is available, downloading and installing the one or more updated dynamically linkable objects; and
      dynamically linking any downloaded updated dynamically linkable objects and any remaining dynamically linkable objects not updated to the main entry object to provide a fully-functional dynamic printer driver;
   using the fully-functional dynamic printer driver to render the print job; and
   using the main entry object to dynamically unlink the dynamically linkable objects linked to the main entry object upon completion of the print job.

2. A method as recited in claim 1, wherein the step of contacting a printer driver source to determine whether any updated dynamically linkable objects are available comprises a step of determining whether permission exists to perform an update.

3. A method as recited in claim 1, wherein the step of downloading and installing the one or more updated dynamically linkable objects includes a step of determining whether to notify a user of the downloading of the one or more updated dynamically linkable objects, and wherein if the user is to be notified, performing the step of notifying the user.

4. A computer program product for implementing within a computer system a method for automatically updating a printer driver after printing is initiated without requiring user initiation of an update, the computer program product comprising
   a computer readable medium for providing computer program code means utilized to implement the method, wherein the computer program code means is comprised of executable code for implementing the steps of:
      providing all functional code required for performing printer driver specific functions as dynamically linkable objects accessible by a main entry object of a printer driver, wherein the main entry object lacks functional code for performing printer driver specific functions;
      initiating a request to the main entry object to render a print job, wherein the printer driver comprises the main entry object but lacks functional code required to process the print job at the time the request to render the print job is initiated to the main entry object;
      performing the following steps, using the main entry object, after the request to render the print job is initiated:
         contacting a printer driver source to determine whether any updated dynamically linkable objects are available and, if one or more updated dynamically linkable objects is available, downloading and installing the one or more updated dynamically linkable objects; and
         dynamically linking any downloaded updated dynamically linkable objects and any remaining dynamically linkable objects not updated to the main entry object to provide a fully-functional dynamic printer driver;
      using the fully-functional dynamic printer driver to render the print job; and
      using the main entry object to dynamically unlink the dynamically linkable objects linked to the main entry object upon completion of the print job.

5. A computer program product as recited in claim 4, wherein the step of contacting a printer driver source to determine whether any updated dynamically linkable objects are available comprises a step of determining whether permission exists to perform an update.

6. A computer program as recited in claim 4, wherein the step of downloading and installing the one or more updated dynamically linkable objects includes a step of determining whether to notify a user of the downloading of the one or more updated dynamically linkable objects, and wherein if the user is to be notified, performing the step of notifying the user.

7. A system configured to automatically update a printer driver after printing is initiated without requiring user initiation of an update, the system comprising:
   a printer device in communication with a computer device;
   a printer driver source in communication with the computer device having one or more dynamically linkable objects containing functional code required to perform printer driver specific functions;
   a dynamic printer driver of the computer device that is configured to render a print job that has been initiated, wherein the dynamic printer driver comprises a main entry object lacking functional code required to perform printer driver specific functions and wherein the dynamic printer driver also lacks functional code required to perform printer driver specific functions at the time the request to render the print job is initiated to the printer driver;

whereby, after initiation of the print job to the dynamic printer driver, the main entry object is configured to:

contact the printer driver source to determine whether any updated dynamically linkable objects are available and, if one or more updated dynamically linkable objects is available, downloading and installing the one or more updated dynamically linkable objects;

dynamically link any downloaded updated dynamically linkable objects and any remaining dynamically linkable objects not updated to the main entry object to provide full functionality to the dynamic printer driver;

render the print job; and dynamically unlink the dynamically linkable objects linked to the main entry object upon completion of the print job.

8. A system as recited in claim 7, wherein the printer driver source is in communication with the computer device through at least one of:

a network connection;
a hard-wired connection;
a wireless connection; and
an integrated connection.

9. A system as recited in claim 8, wherein the network connection includes a LAN.

10. A system as recited in claim 8, wherein the network connection includes a WAN.

11. A system as recited in claim 7, further comprising a print subsystem mechanism of the computer device for use in performing the update, wherein the print subsystem mechanism comprises at least one of:

a printer driver;
a spooler;
a print processor; and
a print assist.

12. A system as recited in claim 11, wherein the print subsystem mechanism is configured to communicate with a resource management device of the printer driver source through the utilization of an interface.

13. A system as recited in claim 12, wherein the resource management device is a web server and the interface is a web browser.

14. A system as recited in claim 12, wherein the resource management device is a file server and the interface is a network file system.

15. A system as recited in claim 11, wherein the print subsystem mechanism is configured to communicate directly with a resource management device of the printer driver source, and wherein the resource management device is a remote spooler.

16. A system as recited in claim 11, wherein the printer driver source comprises a server.

17. A system as recited in claim 16, wherein the print subsystem mechanism is configured to communicate with the server through the utilization of an interface.

18. A system as recited in claim 17, wherein the server is a web server and the interface is a web browser.

19. A system as recited in claim 17, wherein the server is a file server and the interface is a network file system.

20. A system as recited in claim 16, wherein the server comprises a remote spooler, and wherein the print subsystem mechanism is configured to communicate directly with the remote spooler.

21. A system as recited in claim 7, wherein the printer driver source is a printer device.

22. A system as recited in claim 7, wherein the printer device is an MFP.

23. A system as recited in claim 7, wherein the dynamic printer driver further comprises a dynamically linkable object script.

* * * * *